United States Patent
Tadpatrikar et al.

(10) Patent No.: US 10,269,341 B2
(45) Date of Patent: Apr. 23, 2019

(54) SPEECH ENDPOINTING

(71) Applicant: Google LLC, Mountain View, CA (US)

(72) Inventors: Siddhi Tadpatrikar, Sunnyvale, CA (US); Michael Buchanan, London (GB); Pravir Kumar Gupta, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/196,663

(22) Filed: Jun. 29, 2016

(65) Prior Publication Data

US 2017/0110116 A1    Apr. 20, 2017

Related U.S. Application Data

(63) Continuation of application No. 14/923,637, filed on Oct. 27, 2015.

(Continued)

(51) Int. Cl.
*G10L 15/26* (2006.01)
*G10L 15/05* (2013.01)
(Continued)

(52) U.S. Cl.
CPC ........ *G10L 15/05* (2013.01); *G06F 17/30746* (2013.01); *G10L 15/04* (2013.01);
(Continued)

(58) Field of Classification Search
CPC ...................................................... G10L 15/26
(Continued)

(56) References Cited

U.S. PATENT DOCUMENTS 6,321,197 B1   11/2001   Kushner
6,324,509 B1   11/2001   Bi
(Continued)

FOREIGN PATENT DOCUMENTS

JP    H01-219893    9/1989
JP    7104676       11/1995
(Continued)

OTHER PUBLICATIONS

Extended European Search Report in European Application No. 16188499.4-1901, dated Feb. 21, 2017, 8 pages.
(Continued)

*Primary Examiner* — Jakieda R Jackson
(74) *Attorney, Agent, or Firm* — Fish & Richardson P.C.

(57) ABSTRACT

Methods, systems, and apparatus, including computer programs encoded on a computer storage medium, for speech endpointing are described. In one aspect, a method includes the action of accessing voice query log data that includes voice queries spoken by a particular user. The actions further include based on the voice query log data that includes voice queries spoken by a particular user, determining a pause threshold from the voice query log data that includes voice queries spoken by the particular user. The actions further include receiving, from the particular user, an utterance. The actions further include determining that the particular user has stopped speaking for at least a period of time equal to the pause threshold. The actions further include based on determining that the particular user has stopped speaking for at least a period of time equal to the pause threshold, processing the utterance as a voice query.

22 Claims, 4 Drawing Sheets

Related U.S. Application Data

(60) Provisional application No. 62/243,463, filed on Oct. 19, 2015.

(51) Int. Cl.
   | | | |
   |---|---|---|
   | *G10L 25/78* | (2013.01) | |
   | *G10L 15/065* | (2013.01) | |
   | *G06F 17/30* | (2006.01) | |
   | *G10L 15/04* | (2013.01) | |
   | *G10L 15/22* | (2006.01) | |
   | *G10L 15/07* | (2013.01) | |

(52) U.S. Cl.
   CPC .......... *G10L 15/065* (2013.01); *G10L 15/22* (2013.01); *G10L 15/26* (2013.01); *G10L 25/78* (2013.01); *G10L 15/07* (2013.01); *G10L 2025/783* (2013.01)

(58) Field of Classification Search
   USPC ...................................................... 704/235
   See application file for complete search history.

(56) References Cited

U.S. PATENT DOCUMENTS

| | | |
   |---|---|---|
   | 6,771,887 B1 | 8/2004 | Okawa et al. |
   | 7,035,807 B1 | 4/2006 | Brittain et al. |
   | 7,177,810 B2 | 2/2007 | Shriberg |
   | 7,665,024 B1 | 2/2010 | Kondziela |
   | 8,165,880 B2 | 4/2012 | Hetherington |
   | 8,170,875 B2 | 5/2012 | Hetherington |
   | 8,175,876 B2 | 5/2012 | Bou-Ghazale |
   | 8,554,564 B2 | 10/2013 | Hetherington |
   | 8,600,746 B1 | 12/2013 | Lei et al. |
   | 8,762,150 B2 | 6/2014 | Edgington |
   | 9,437,186 B1 | 9/2016 | Liu et al. |
   | 2001/0034601 A1 | 10/2001 | Chujo et al. |
   | 2001/0056344 A1 | 12/2001 | Ramaswamy et al. |
   | 2005/0108011 A1 | 5/2005 | Keough et al. |
   | 2005/0171768 A1 | 8/2005 | Gierach |
   | 2006/0149558 A1 | 7/2006 | Kahn et al. |
   | 2006/0200350 A1 | 9/2006 | Attwater |
   | 2006/0235688 A1 | 10/2006 | Bicego |
   | 2007/0100626 A1 | 5/2007 | Miller |
   | 2007/0168890 A1 | 7/2007 | Zhao et al. |
   | 2008/0235019 A1* | 9/2008 | Witzman ................ G10L 15/26 704/251 |
   | 2009/0063150 A1 | 3/2009 | Nasukawa et al. |
   | 2009/0149166 A1 | 6/2009 | Habib et al. |
   | 2010/0017209 A1 | 1/2010 | Yu et al. |
   | 2010/0076761 A1 | 3/2010 | Juergen et al. |
   | 2010/0131279 A1 | 5/2010 | Pilz |
   | 2010/0174533 A1 | 7/2010 | Pakhomov |
   | 2010/0280827 A1 | 11/2010 | Mukerjee et al. |
   | 2010/0292989 A1 | 11/2010 | Kitade et al. |
   | 2011/0105859 A1 | 5/2011 | Popovic et al. |
   | 2011/0153309 A1 | 6/2011 | Kim et al. |
   | 2011/0264447 A1 | 10/2011 | Visser et al. |
   | 2012/0089392 A1 | 4/2012 | Larco et al. |
   | 2013/0124646 A1 | 5/2013 | Kraft et al. |
   | 2014/0337370 A1 | 11/2014 | Aravamudan et al. |
   | 2015/0106088 A1 | 4/2015 | Jarvinen |
   | 2015/0199966 A1 | 7/2015 | Paulik |
   | 2015/0206544 A1 | 7/2015 | Carter |
   | 2015/0312246 A1 | 10/2015 | Mattsson et al. |
   | 2016/0063992 A1 | 3/2016 | Selfridge |
   | 2016/0351196 A1 | 12/2016 | Fanty |
   | 2016/0379632 A1 | 12/2016 | Hoffmeister |
   | 2017/0354363 A1 | 12/2017 | Quatieri |

FOREIGN PATENT DOCUMENTS

| | | |
   |---|---|---|
   | JP | H08-115093 | 5/1996 |
   | JP | H10-254475 | 9/1998 |
   | JP | 2005-017932 | 1/2005 |
   | JP | 2008-508564 | 3/2008 |
   | JP | 2014-134675 | 7/2014 |
   | JP | 4433704 | 3/2017 |
   | WO | 2001086633 | 11/2001 |
   | WO | 2015/073071 | 5/2015 |

OTHER PUBLICATIONS

Extended European Search Report in European Application No. 16188500.9, dated Mar. 31, 2017, 8 pages.
Office Action issued in Korean Application No. 10-2016-0117524, dated Aug. 14, 2017, 5 pages (English Translation).
Office Action issued in Japanese Application No. 2016-246365, dated Mar. 5, 2018, 9 pages (with English Translation).
Office Action issued in Japanese Application No. 2016-179291, dated Jan. 22, 2018, 8 pages (with English Translation).
Office Action issued in Korean Application No. 10-2016-0117524, dated Apr. 26, 2018, 7 pages (with English translation).
Office Action issued in Korean Application No. 10-2016-0117524, dated Jun. 27, 2018, 13 pages (with English translation).
Ferrer et al., "A Prosody-Based Approach to End-of-Utterance Detection that does not require Speech Recognition," IEEE International Conference on Acoustics, Speech, and Signal Processing, 2003, 1:I-608-I-611.
Ferrer et al., "Is the Speaker done yet? Faster and more accurate End-of-Utterance detection using Prosody," INTERSPEECH, ISCA, (2002), 2061-2064.
Gotoh et al., "Sentence Boundary Detection in Broadcast Speech Transcripts," in Proc. of ISCA Workshop: Automatic Speech Recognition: Challenges for the new Millennium ASR-2000, Sep. 2000, 8 pages.
Liu et al., "Comparing and Combining Generative and Posterior Probability Models: Some Advances in Sentence Boundary Detection in Speech," Proc. EMNLP, 2004, Jan. 2004, 8 pages.
Office action in Japanese Application No. 2016-179291, dated Sep. 21, 2018, 4 pages (with English Translation).

* cited by examiner

SPEECH ENDPOINTING

CROSS-REFERENCE TO RELATED APPLICATION

This application is a continuation of U.S. application Ser. No. 14/923,637, filed Oct. 27, 2015, which claims the benefit of U.S. Provisional Application No. 62/243,463, filed Oct. 19, 2015, the contents of each are incorporated by reference.

TECHNICAL FIELD

This disclosure generally relates to speech recognition, and one particular implementation relates to endpointing speech.

BACKGROUND

Natural language processing systems typically use endpointers to determine when a user has started and finished speaking. Some traditional endpointers evaluate the duration of pauses between words in determining when an utterance begins or ends. For instance, if a user says "what is <long pause> for dinner," a traditional endpointer may segment the voice input at the long pause, and may instruct the natural language processing system to attempt to process the incomplete phrase "what is," instead of the complete phrase "what is for dinner." If an endpointer designates an incorrect beginning or ending point for a voice input, the result of processing the voice input using the natural language processing system may be inaccurate or undesirable.

SUMMARY

Different users may have different comfort levels with using voice input on their mobile devices. Some users may use the voice input features frequently and be able to form voice queries without hesitating during speaking. Other users may not use the voice input features as often or quickly formulate queries without hesitating. The more experienced user may benefit from a system that begins to process the user's voice queries after measuring a short pause in the user's speech. The less experienced user may benefit form a system that begins to process the user's voice queries after measuring a longer pause in the user's speech to ensure the less experienced user has finished speaking.

To determine a pause length to apply to a particular user's voice queries, a system analyzes the particular user's previous voice queries. For a particular user, the system looks at voice query frequency, pause length between words of previous voice queries, completeness of previous voice queries, and length of previous voice queries. A user who more frequently speaks voice queries may benefit from a shorter pause length to apply to a user's voice queries compared to a user who does not speak voice queries as frequently. A user who has a short average pause length between words of previous voice queries may benefit from a shorter pause length than a user who has longer average pause lengths between words. A user who speaks complete voice queries more often may benefit from a shorter pause length than a user who speaks complete queries less frequently. A user who speaks longer voice queries may benefit from a shorter pause length than a user who speaks shorter voice queries. Once the system computes an appropriate pause length to apply to a particular user's voice queries, the system may generate an endpoint during the particular user's future utterances using the particular user's pause length.

In general, another innovative aspect of the subject matter described in this specification may be implemented in methods that include the actions of accessing voice query log data that includes voice queries spoken by a particular user; based on the voice query log data that includes voice queries spoken by a particular user, determining a pause threshold from the voice query log data that includes voice queries spoken by the particular user; receiving, from the particular user, an utterance; determining that the particular user has stopped speaking for at least a period of time equal to the pause threshold; and based on determining that the particular user has stopped speaking for at least a period of time equal to the pause threshold, processing the utterance as a voice query.

These and other embodiments can each optionally include one or more of the following features. The action of determining the pause threshold from the voice query log data that includes voice queries spoken by the particular user includes classifying the particular user as an expert user of a speech recognition system or as a novice user of the speech recognition system; and based on classifying the particular user as the expert user of the speech recognition system or as the novice user of the speech recognition system, determining the pause threshold. The voice query log data a timestamp associated with each voice query, data indicating whether each voice query is complete, and speech pause intervals associated with each voice query. The action of determining a pause threshold from the voice query log data that includes voice queries spoken by the particular user includes determining the pause threshold based on the timestamp associated with each voice query, the data indicating whether each voice query is complete, and the speech pause intervals associated with each voice query.

The actions further include based on the voice query log data, determining an average number of voice queries spoken by the particular user each day. The action of determining the pause threshold is based further on the average number of voice queries spoken by the particular user each day. The actions further include based on the voice query log data, determining an average length of voice queries spoken by the particular user. The action of determining the pause threshold is based further on the average length of voice queries spoken by the particular user. The actions further include based on the voice query log data, determining an average pause interval for voice queries spoken by the particular user. The action of determining the pause threshold is based further on the average pause interval for voice queries spoken by the particular user.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A user may use the voice input capabilities of a computing device and speak at a pace that is comfortable for the user. An utterance may be endpointed at the intended end of the utterance, leading to more accurate or desirable natural language processing outputs, and to faster processing by the natural language processing system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
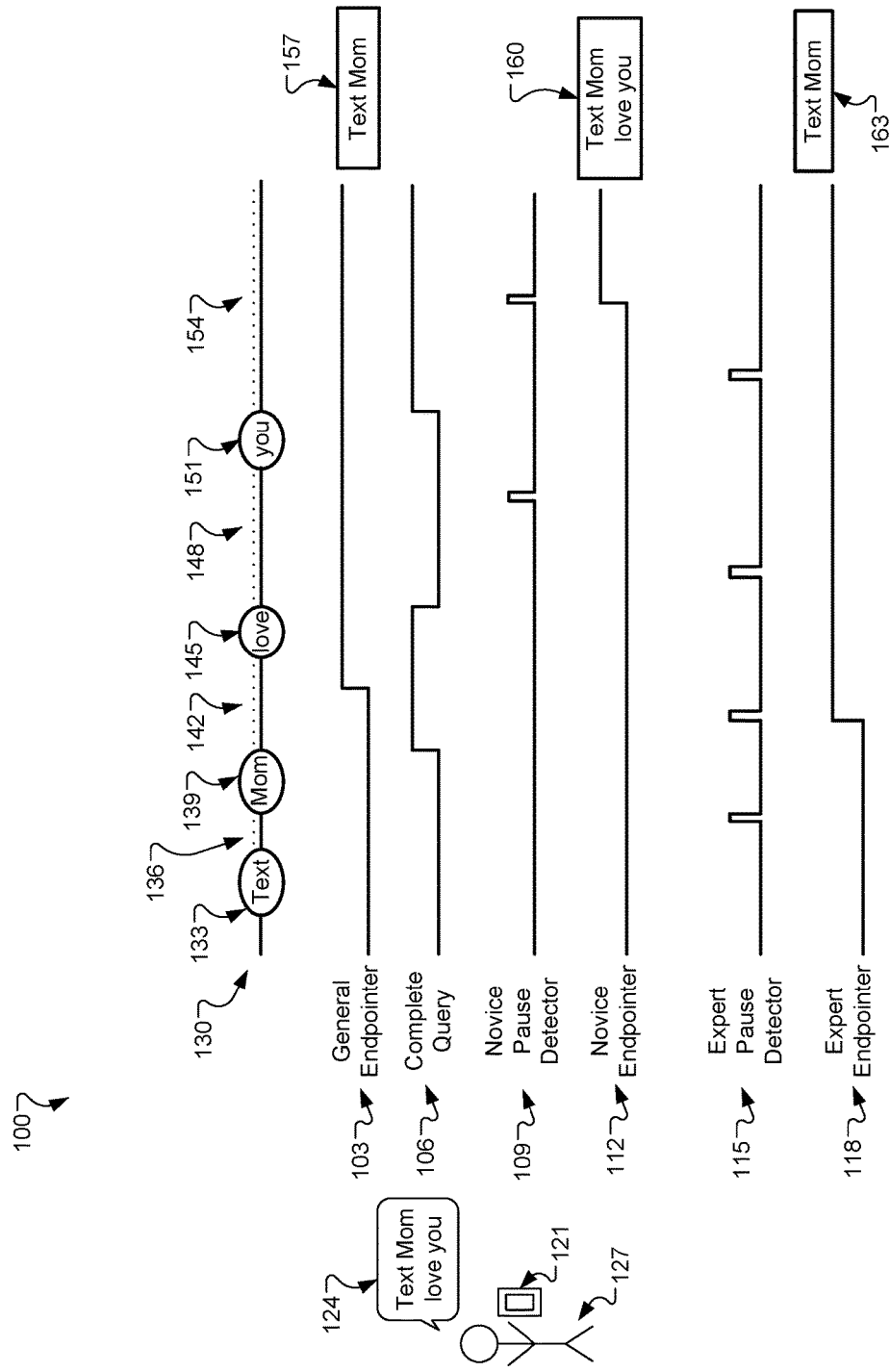
FIG. 1 is a diagram of example utterances and signals used in determining, for a particular user, whether a user has finished speaking a voice query.

FIG. 1 is a diagram 100 of example utterances and signals used in determining, for a particular user, whether a user has finished speaking a voice query. In general, diagram 100 illustrates signals 103-118 that are generated or detected by computing device 121 when the computing device 121 is processing an incoming audio input. The computing device 121 receives the audio data corresponding to utterance 124 through a microphone or other audio input device of the computing device 121, and generates a transcription of the utterance 124 depending on a user profile assigned to the user 127.

The utterance timing 130 represents the timing of the various words of the user 127 speaking utterance 124 (in the FIG. 1, "Text Mom love you"). The user 127 speaks each word with an increasing pause length between each word. The number of dots between each word is proportional to the pause length between each word. Each dot may represent a particular period of time, such as one hundred milliseconds. The first word 133, "Text," is followed by pause 136 of three dots that may correspond to three hundred milliseconds. The second word 139, "Mom," is followed by pause 142 of eight dots that may correspond to eight hundred milliseconds. The third word 145, "love," is followed by pause 128 of twelve dots that may correspond to 1.2 seconds. The fourth word 151, "you," is followed by pause 154. In FIG. 1, pause 154 is twenty dots that may correspond to two seconds. Because word 151 is at the end of utterance 124, a pause after word 151 may be much longer than pause 154 because the user 127 has stopped speaking. These pauses and the other pauses described below represent a natural period of silence between two words, and not that the user actively stopped speaking.

In some implementations, the computing device 121 may generate, without factoring in any characteristics of the user 127, the general endpoint signal 103 and the complete query signal 106. The complete query signal 106 represents an estimate performed by the computing device 121 that the generated transcription of the utterance 130 represents a complete utterance. The computing device 121 compares the generated transcription to one or more complete utterances that the user 127 and other users have previously spoken. The computing device 121 may compare the generated transcription to the complete utterances after a speech recognizer of computing device 121 has identified a new word. For example, after the user 127 speaks word 133, a speech recognizer of the computing device 121 generates the transcription "text." The computing device 121 compares "text" to other complete utterances and determines that "text" is not a complete utterance. After the user 127 speaks word 139, the speech recognizer generates the transcription "text mom" that the computing device 121 identifies as complete. A similar determination is made after word 151. After the user 127 speaks word 145, the speech recognizer generates the transcription "text mom love" that the computing device 121 identifies as incomplete.

The general endpoint signal 103 represents an estimate performed by the computing device 121 that the user 127 has finished speaking. The computing device 121 may generate the general endpoint signal 103 based on the length of pauses between speech audio. The computing device 121 may generate the general endpoint signal 103 without generating a transcription of the utterance 124. For example, the computing device 121 may receive audio data corresponding to word 133. During pause 136, the computing device 121 measures the time as it elapses during pause 136. The pause 136 may only last for three hundred milliseconds. If the general endpoint threshold is longer than three hundred milliseconds, such as six hundred milliseconds, then the computing device 121 will not trigger the general endpointer. After the computing device 121 receives audio data corresponding to word 139, the computing devices 121 measures the time of pause 142. After six hundred milliseconds of pause 142 has elapsed, the computing device 121 triggers the general endpointer and the general endpoint signal 103 indicates that an endpoint has been reached. With the general endpoint signal 103 indicating an endpoint of the utterance 124 and the complete query signal 106 indicating that the utterance 124 is complete, the computing device generates transcription 157, "text mom," for utterance 124.

In some implementations, the computing device 121 may factor in the characteristics of the user 127 when identifying an endpoint of the utterance 124. On one hand, a novice user may speak with longer pauses between words possibly because the novice user may be unfamiliar with what terms may be best to speak to the computing device 121. On the other hand, an expert user may speak with shorter pauses between words because the expert user may be more comfortable and familiar with the speech input technology of computing device 121. Accordingly, the computing device 121 may lengthen or shorten the amount of time before it identifies a pause depending on how the computing device 121 categorizes the user.

The novice pause detector signal 109 illustrates the computing device 121 detecting a pause in audio data corresponding to utterance 124, where the detected pause length is longer than the pause length the corresponds to the general endpointer. For example, the computing device 121 may detect pauses with a length of one second when the user 127 is classified as a novice user. Applying this pause threshold to utterance 124, the computing device 121 will not detect novice length pauses during pauses 136 and 124 because those pauses are of length three hundred milliseconds and eight hundred milliseconds, respectively. The computing device 121 does detect novice length pauses during pauses 148 and 154. As shown in novice pause detector signal 109, the computing device 121 detects a pause of one second during pause 148 after the user 127 spoke word 145. The computing device 121 also detects a pause of one second during pause 154 after the user spoke word 151.

The computing device 121 determines, based on the novice pause detector signal 109 and the complete query signal 106, a speech endpoint for the utterance 124 when the computing device classifies the user as a novice. When the computing device 121 detects a pause, such as the pause of the novice pause detector signal 109 during pause 148, the computing device 121 determines whether the utterance 124 is complete. During pause 148, the complete query signal 106 indicates that the utterance 124 is not complete. Even though the computing device 121 detected a novice length pause, the utterance 124 is not complete, so the computing device 121 continues processing the audio data of the utterance 124. During pause 154, the computing device 121 detects a novice length pause and the complete query signal 106 indicates that the utterance is complete and, therefore, generates an endpoint of the utterance 124 as indicated by the novice endpoint signal 112. When the user 127 is classified as a novice, the endpoint of the utterance 124 is after word 151, and the transcription 160 of the utterance 124 is "Text Mom love you."

The expert pause detector signal 115 illustrates the computing device 121 detecting a pause in audio data corresponding to utterance 124, where the detected pause length is shorter than the pause length the corresponds to the general endpointer. For example, the computing device 121 may detect pauses with a length of three hundred milliseconds when the user 127 is classified as an expert user. Applying this pause threshold to utterance 124, the computing device 121 detects expert length pauses during pauses 136, 142, 148, and 154. Because none of the pauses are less than three hundred milliseconds, all of the pauses in utterance 124 include an expert length pause detection.

The computing device 121 combines the expert pause detector signal 115 and the complete query signal 106 to determine a speech endpoint for the utterance 124 when the computing device classifies the user as an expert. When the computing device 121 detects a pause, such as the pause of the expert pause detector signal 115 during pause 136, the computing device 121 determines whether the utterance 124 is complete. During pause 136, the complete query signal 106 indicates that the utterance 124 is not complete. Even though the computing device 121 detected an expert length pause, the utterance 124 is not complete, so the computing device 121 continues processing the audio data of the utterance 124. During pause 142, the computing device 121 detects an expert length pause and the complete query signal 106 indicates that the utterance is complete and, therefore, generates an endpoint of the utterance 124 as indicated by the expert endpoint signal 118. When the user 127 is classified as an expert, the endpoint of the utterance 124 is after word 139, and the transcription 163 of the utterance 124 is "Text Mom."

Figure 2:
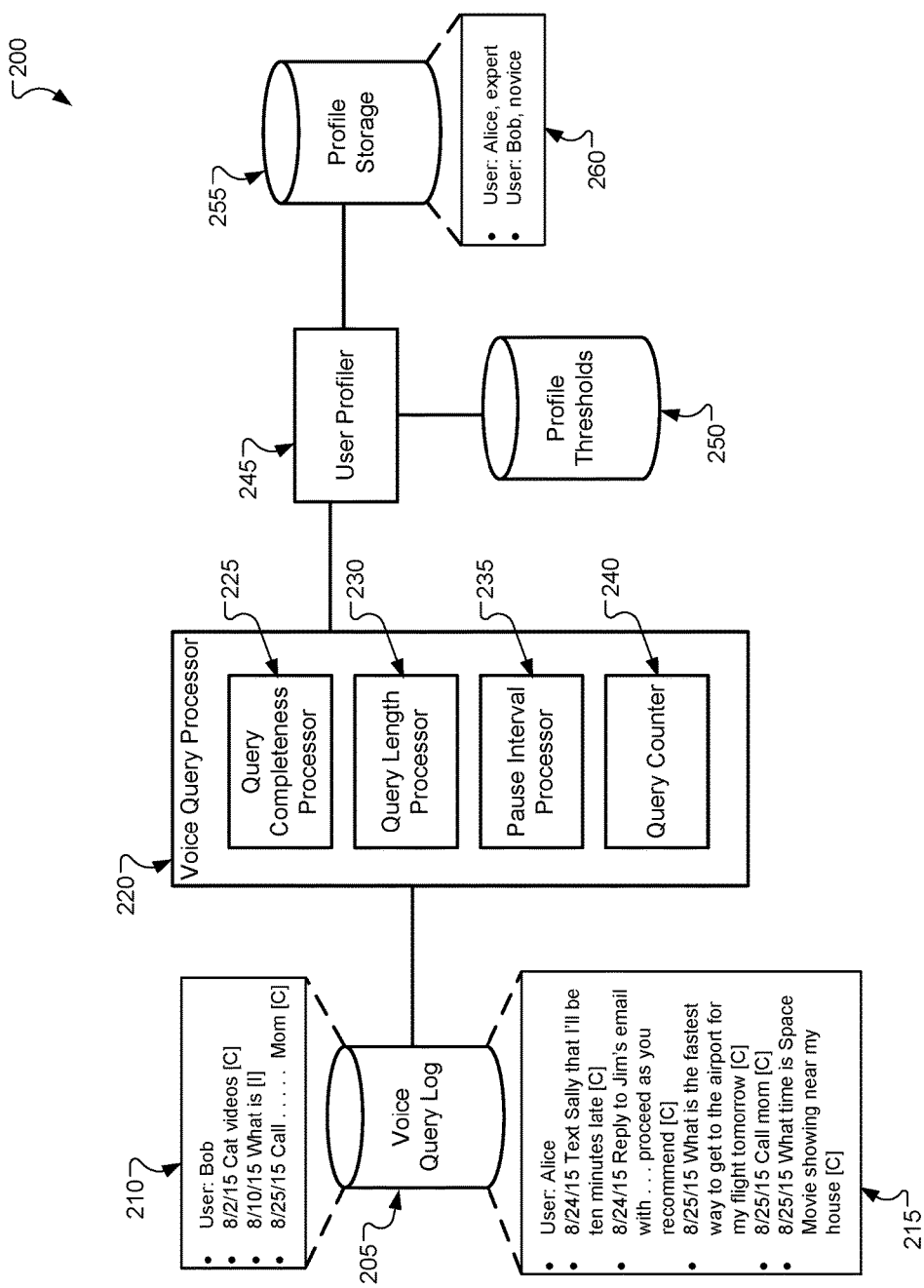
FIG. 2 is a diagram of an example system that classifies a particular user based on the particular user's experience with speech input.

FIG. 2 is diagram of an example system 200 that classifies a particular user based on the particular user's experience with speech input. In some implementations, the system 200 may be included in a computing device that the particular user uses for speech input, such as computing device 121. In some implementations, the system may be included in a server that processes transcriptions of speech input.

The system 200 includes voice queries 205. The voice query log 205 stores the previous voice queries that users provide to the system 200. The voice query log 205 may include search queries, for example, "cat videos," and command queries, for example, "call mom." The voice query log 205 may include for each stored voice query, a timestamp, data indicating the duration of each pause between words, and data indicating whether the voice query is complete or incomplete based on a comparison with other voice queries.

Query log 210 illustrates the voice queries provided by the user Bob. The voice queries in query log 210 include three voice queries and each includes either a complete indicator "[C]" or an incomplete indicator "[I]." Each voice query includes a timestamp that notes the date and time that Bob spoke the voice query. Each voice query includes data indicating the pause intervals between the spoken words. For example, "cat videos" may include data to indicate that Bob paused two hundred milliseconds between "cat" and "video." "Call . . . mom" may include data to indicate that Bob paused one second between "call" and "mom."

Query log 215 illustrates the voice queries provided by the user Alice. The voice queries in query log 215 include five voice queries and each includes either a complete indicator "[C]" or an incomplete indicator "[I]." Each voice query includes a timestamp that notes the date and time that Alice spoke the voice query. Each voice query includes data indicating the pause intervals between the spoken words. For example, "Text Sally that I'll be ten minutes late" may include data to indicate that Alice paused one millisecond between "text" and "Sally," paused three hundred milliseconds between "Sally" and "that," and paused 1.5 seconds between "that" and "I'll," as well as pause intervals between the other words. "Call mom" may include data to indicate that Alice paused three milliseconds between "call" and "mom."

The voice query processor 220 processes the voice queries received from the voice query log 205. The voice query processor 220 generates a voice query experience score for each user. The voice query experience score indicates a level of experience that a particular user has with voice queries. A higher voice query experience score indicates that the particular user may have more experience with speaking voice queries. For example, to generate the voice query experience score for Bob, the voice query processor 220 processes query log 210.

The voice query processor 220 includes a query completeness processor 225. The query completeness processor 225 accesses, for each user, the completeness data for each voice query and adjusts the user's voice query experience score. If a particular user has more complete voice queries and fewer incomplete voice queries, then the query completeness processor 225 increases the voice query experience score. If a particular user has more incomplete voice queries and fewer complete voice queries, then the query completeness processor 225 decreases the voice query experience score. The query completeness processor 225 may compare a ratio of complete queries to incomplete queries to a completeness ratio threshold in determining whether to increase or decrease the voice query experience score. For example, Bob has one incomplete voice query and two complete queries. Based on that information, the query completeness processor 225 may decrease Bob's voice query experience score. Alice has no incomplete voice queries and five complete queries. Based on that information, the query completeness processor 225 may increase Alice's voice query experience score.

The voice query processor 220 includes a query length processor 230. The query length processor 230 computes, for each user, a length of each voice query and adjusts the user's voice query experience score. If a particular user has more long voice queries and fewer short voice queries, then the voice query processor 220 increases the voice query experience score. If a particular user has more short voice queries and fewer long voice queries, then the voice query processor 220 decreases the voice query experience score. The query length processor 230 may use a threshold to determine whether a voice query is long or short. The query length processor 230 may compare a ratio of long queries to short queries to a length ratio threshold in determining whether to increase or decrease the voice query experience score. For example, Bob has one incomplete voice query and two complete queries. Based on that information, the query completeness processor 225 may decrease Bob's voice query experience score. Alice has no incomplete voice queries and five complete queries. Based on that information, the query completeness processor 225 may increase Alice's voice query experience score.

The voice query processor 220 includes a pause interval processor 235. The pause interval processor 235 computes, for each user, an average pause length between words for the user's voice queries. The pause interval processor 235 may compare the average pause length for each user to a pause threshold to determine whether to increase or decrease the user's voice query experience score. An average pause length above the pause threshold decreases the voice query experience score. An average pause length below the pause threshold increases the voice query experience score. For example, Bob may have an average pause length of 1.2 seconds. Alice may have an average pause length of two hundred milliseconds. If the pause threshold is one second, then the pause interval processor 235 increases the voice query experience score for Alice and decreases the voice query experience score for Bob.

The voice query processor 220 includes a query counter 240. The query counter 240 computes, for each user, a number of voice queries submitted and adjusts the voice query experience score. If a particular user provides many voice queries, then the voice query processor 220 increases the voice query experience score. If a particular user provides fewer voice queries, then the voice query processor 220 decreases the voice query experience score. The query length processor 230 may use a daily voice query threshold and compare the threshold to an average daily number of voice queries to determine whether a user submits many or few voice queries. For example, the daily voice query threshold is one query per day. Based on query log 210, Bob submitted less than one query per day. Therefore, the query counter 240 decreases Bob's voice query experience score. Alice has more than one query per day based on query log 215. Therefore, the query counter 240 increases Alice's voice query experience score.

Each of the processors included in the voice query processor 220 may increase or decrease the user's voice query experience score an amount that is proportional to a difference between the threshold and the corresponding user's value. For example, Alice averages 2.5 voice queries per day, and Bob averages 0.125 queries per day. With a daily voice query threshold of one query per day, Alice is 1.5 over the threshold, and Bob is 0.875 below the threshold. The query counter 240 increases Alice's voice query experience score by some factor multiplied by 1.5 and decreases Bob's voice query experience score by the same factor multiplied by 0.875.

The voice query processor 220 provides each user's voice query experience score to a user profiler 245. The user profiler 245 assigns a voice query experience profile to each user based the user's voice query experience score. The voice profiler 245 accesses the profile thresholds 250 to match each user's voice query experience score to a voice query experience profile. Each voice query experience profile may correspond to a range of voice query experience score. For example, an expert profile may correspond to a range of 80 to 100. A novice profile may correspond to a range of 0 to 20. Other profiles may exist between the voice query experience scores of 20 and 80. In the example in FIG. 2, Bob may have a voice query experience score of 18 and Alice may have a voice query experience score of 88. Therefore, Bob is classified as a novice, and Alice is classified as an expert. The user profiler 245 then stores the voice query experience profile for each user in profile storage 255. Profiles 260 illustrates the profiles of Alice and Bob stored in profile storage 255

Each voice query experience profile corresponds to a different pause length threshold that the system 200 subsequently uses when generating an endpoint for a future utterance. As shown in FIG. 1 and described above, the expert profile corresponds to a pause length threshold of three hundred milliseconds that is used to endpoint an utterance. The novice profile corresponds to a pause length threshold of one second. The system 200 may define other profiles such as an intermediate profile with a pause length threshold of six hundred milliseconds. In some implementations, the system 200 may assign a pause length threshold to a user without assigning a profile to the user. The system may generate a voice query experience score and compute a pause length threshold that is inversely proportional to the voice query experience score.

Figure 3:
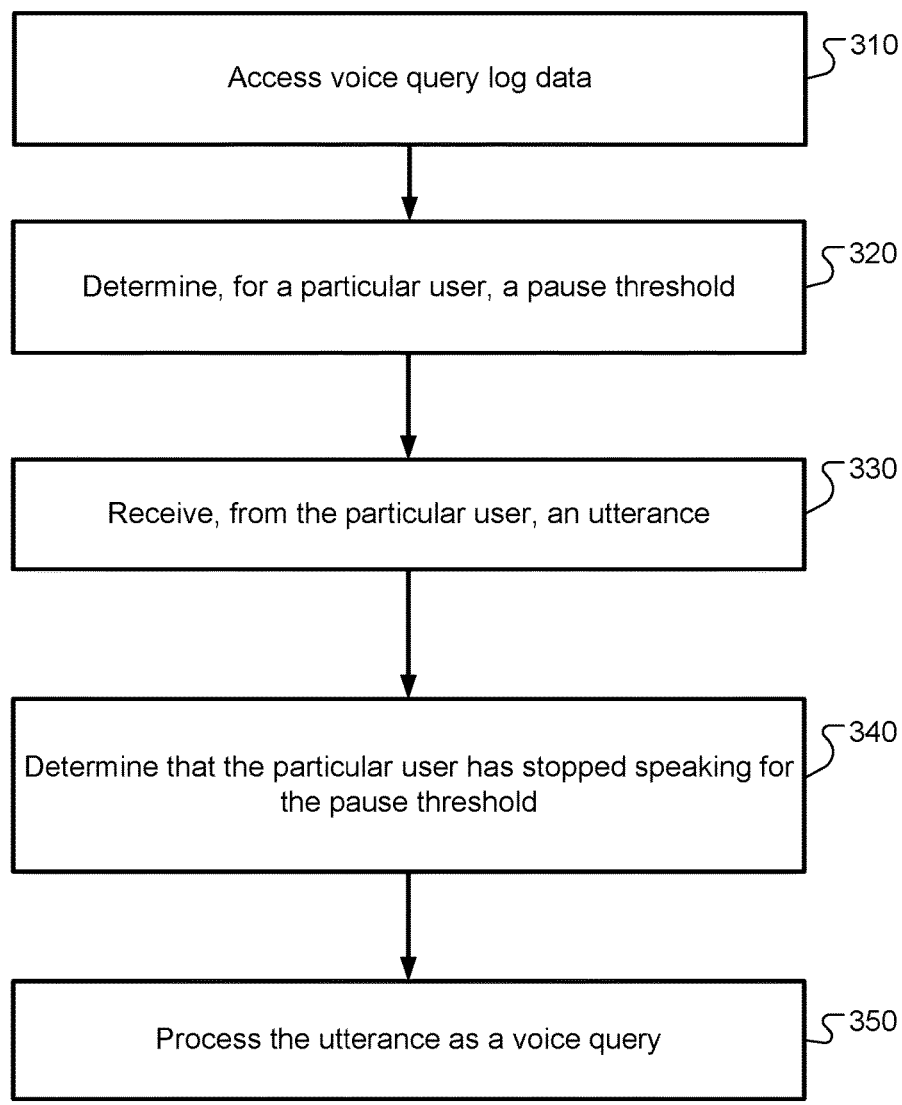
FIG. 3 is a diagram of an example process for classifying a particular user based on the particular user's experience with speech input and determining whether the particular user has finished speaking a voice query.

FIG. 3 is a diagram of an example process 300 for classifying a particular user based on the particular user's experience with speech input and determining whether the particular user has finished speaking a voice query. The process 300 may be performed by a computing device such as computing device 121 from FIG. 1 or computing device 200 from FIG. 2. The process 300 analyzes a user's previous voice queries to determine a pause threshold for use in determining when the user has finished speaking future queries.

The computing device accesses voice query log data (310). The computing device determines, for a particular user, a pause threshold (320). The computing device receives, from the particular user, an utterance (330). The computing device determines that the particular user has stopped speaking for the pause threshold (340). The computing device processes the utterance as a voice query (350).

Figure 4:
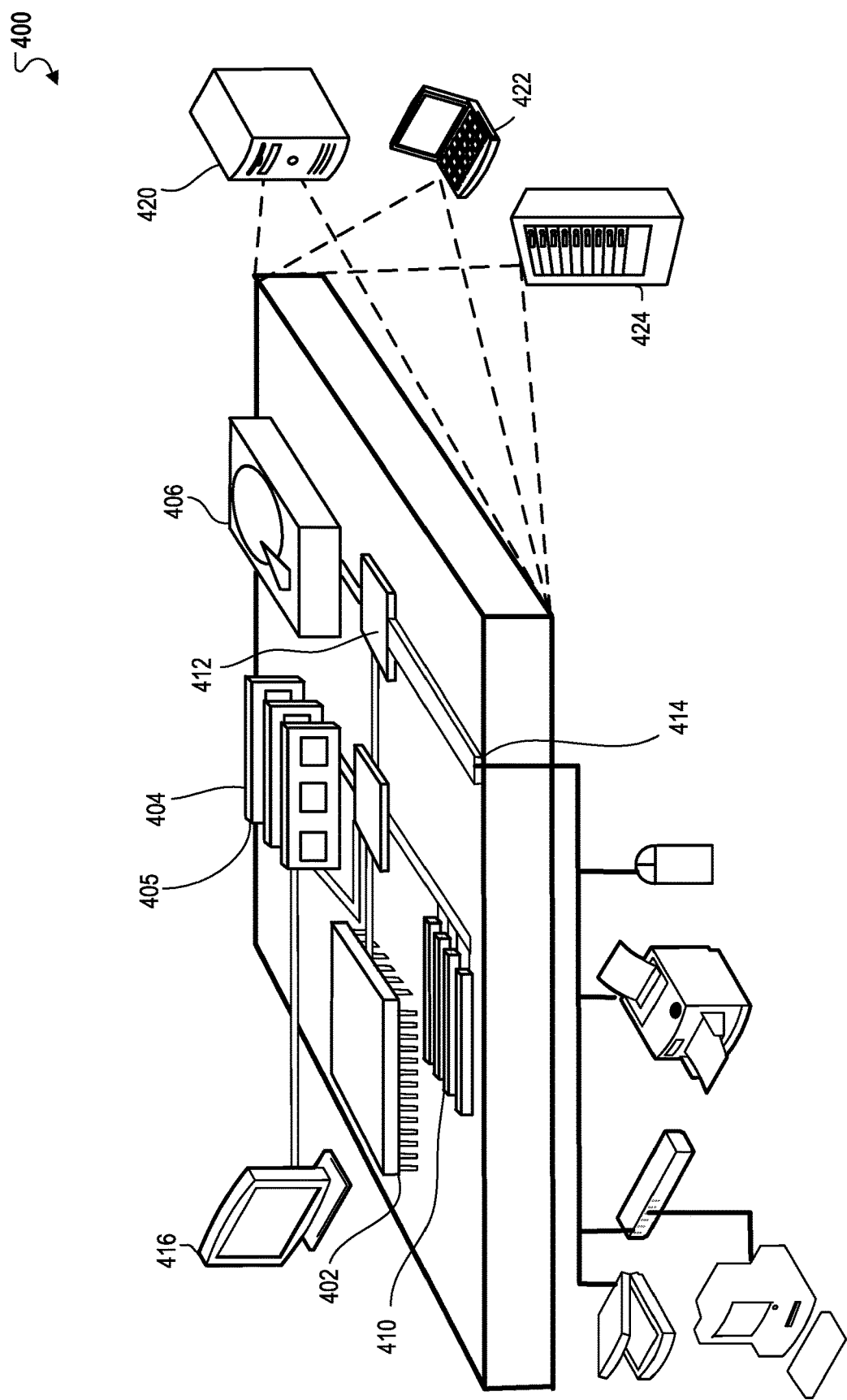
FIG. 4 is a block diagram of computing devices on which the processes described herein, or portions thereof, may be implemented.

FIG. 4 is a block diagram of computing devices 400 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations, e.g., as a server bank, a group of blade servers, or a multi-processor system.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown). Each of such devices may contain one or more of computing device 400 and an entire system may be made up of multiple computing devices 400 communicating with each other.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    accessing a collection of voice queries that were submitted by a particular user, wherein the collection of voice queries is accessed by a voice query processor of a speech recognition system that includes (i) the voice query processor, (ii) a microphone, (iii) an endpointing processor that is configured to endpoint audio data corresponding to an utterance by generating an endpoint signal designating the end of the utterance after speech is not detected for a default pause threshold, and (iv) an automated speech recognizer that is configured to perform automated speech recognition on endpointed audio data having endpoints marked by endpoint signals from the endpoint processor;
    determining, by the speech recognition system, a value for a variable pause threshold for the particular user based on durations of pauses between words of the voice queries in the collection of voice queries;
    generating, using the microphone of the speech recognition system, audio data corresponding to an utterance spoken by the particular user;
    determining, by the endpointing processor of the speech recognition system, that speech of the particular user has not been detected for at least a first period of time equal to the default pause threshold;
    after determining that speech of the particular user has not been detected for the period of time equal to the default pause threshold:
        based on the value of the variable pause threshold for the particular user being greater than the default pause threshold, including audio data for audio before the first period and audio after the first period in a single voice query by bypassing (i) endpointing of the audio data by the endpointing processor and (ii) performing automated speech recognition on the audio data by the automated speech recognizer;
        determining, by the endpointing processor of the speech recognition system, that speech of the particular user has not been detected for at least a second period of time equal to the value of the variable pause threshold determined for the particular user;
        based on determining that speech of the particular user has not been detected for at least the second period of time equal to the value of the variable pause threshold determined for the particular user, endpointing, by the endpointing processor of the speech recognition system, the audio data by designating a temporal location in the audio data at which to end automated speech recognition system processing for the single voice query; and
        in response to endpointing the audio data, performing, by the automated speech recognizer of the speech recognition system, automated speech recognition on a portion of the endpointed audio data that (i) includes audio data before the temporal location in the audio data and (ii) excludes the audio data after the temporal location in the audio data.

2. The method of claim 1, comprising:
    determining, by the speech recognition system, a voice query length based on the voice queries in the collection of voice queries; and
    modifying, by the speech recognition system, the value for the variable pause threshold for the particular user based on the voice query length.

3. The method of claim 2, wherein the voice query length is an average duration of the voice queries in the collection of voice queries.

4. The method of claim 2, wherein the voice query length is an average number of words in the voice queries in the collection of voice queries.

5. The method of claim 1, comprising:
    determining, by the speech recognition system, a quantity of voice queries based on quantities of the voice queries in the collection of voice queries that were spoken each day; and
    modifying, by the speech recognition system, the value for the variable pause threshold for the particular user based on the quantity of voice queries.

6. The method of claim 5, wherein the quantity of voice queries is an average number of the voice queries in the collection of voice queries that were spoken each day.

7. The method of claim 1, comprising:
classifying, by the speech recognition system, the voice queries in the collection of voice queries as complete or incomplete; and
modifying, by the speech recognition system, the value for the variable pause threshold for the particular user based on the classifications.

8. The method of claim 1, comprising:
rounding, by the speech recognition system, the value for the variable pause threshold for the particular user to a nearest duration among a set of predetermined durations.

9. The method of claim 1, wherein the value for the variable pause threshold for the particular user is an average duration of pauses between words of the voice queries in the collection of voice queries.

10. The method of claim 1, wherein:
the speech recognition system includes a query length processor, and
the value for the variable pause threshold for the particular user is determined by the query length processor of the speech recognition system.

11. The method of claim 1, wherein the speech recognition system includes a natural language processing system.

12. A system comprising:
one or more computers and one or more storage devices storing instructions that are operable, when executed by the one or more computers, to cause the one or more computers to perform operations comprising:
accessing a collection of voice queries that were submitted by a particular user, wherein the collection of voice queries is accessed by a voice query processor of a speech recognition system that includes (i) the voice query processor, (ii) a microphone, (iii) an endpointing processor that is configured to endpoint audio data corresponding to an utterance by generating an endpoint signal designating the end of the utterance after speech is not detected for a default pause threshold, and (iv) an automated speech recognizer that is configured to perform automated speech recognition on endpointed audio data having endpoints marked by endpoint signals from the endpoint processor;
determining, by the speech recognition system, a value for a variable pause threshold for the particular user based on durations of pauses between words of the voice queries in the collection of voice queries;
generating, using the microphone of the speech recognition system, audio data corresponding to an utterance spoken by the particular user;
determining, by the endpointing processor of the speech recognition system, that speech of the particular user has not been detected for at least a first period of time equal to the default pause threshold;
after determining that speech of the particular user has not been detected for the period of time equal to the default pause threshold:
based on the value of the variable pause threshold for the particular user being greater than the default pause threshold, including audio data for audio before the first period and audio after the first period in a single voice query by bypassing (i) endpointing of the audio data by the endpointing processor and (ii) performing automated speech recognition on the audio data by the automated speech recognizer;
determining, by the endpointing processor of the speech recognition system, that speech of the particular user has not been detected for at least a second period of time equal to the value of the variable pause threshold determined for the particular user;
based on determining that speech of the particular user has not been detected for at least the second period of time equal to the value of the variable pause threshold determined for the particular user, endpointing, by the endpointing processor of the speech recognition system, the audio data by designating a temporal location in the audio data at which to end automated speech recognition system processing for the single voice query; and
in response to endpointing the audio data, performing, by the automated speech recognizer of the speech recognition system, automated speech recognition on a portion of the endpointed audio data that (i) includes audio data before the temporal location in the audio data and (ii) excludes the audio data after the temporal location in the audio data.

13. The system of claim 12, wherein the operations further comprise:
determining, by the speech recognition system, a voice query length based on the voice queries in the collection of voice queries; and
modifying, by the speech recognition system, the value for the variable pause threshold for the particular user based on the voice query length.

14. The system of claim 12, wherein the operations further comprise:
determining, by the speech recognition system, a quantity of voice queries based on quantities of the voice queries in the collection of voice queries that were spoken each day; and
modifying, by the speech recognition system, the value for the variable pause threshold for the particular user based on the quantity of voice queries.

15. The system of claim 12, wherein the operations further comprise:
classifying, by the speech recognition system, the voice queries in the collection of voice queries as complete or incomplete; and
modifying, by the speech recognition system, the value for the variable pause threshold for the particular user based on the classifications.

16. The system of claim 12, wherein the operations further comprise:
rounding, by the speech recognition system, the value for the variable pause threshold for the particular user to a nearest duration among a set of predetermined durations.

17. The system of claim 12, wherein the value for the variable pause threshold for the particular user is an average duration of pauses between words of the voice queries in the collection of voice queries.

18. A non-transitory computer-readable medium storing software comprising instructions executable by one or more computers which, upon such execution, cause the one or more computers to perform operations comprising:
accessing a collection of voice queries that were submitted by a particular user, wherein the collection of voice queries is accessed by a voice query processor of a speech recognition system that includes (i) the voice query processor, (ii) a microphone, (iii) an endpointing processor that is configured to endpoint audio data corresponding to an utterance by generating an endpoint signal designating the end of the utterance after speech is not detected for a default pause threshold, and (iv) an automated speech recognizer that is configured to perform automated speech recognition on endpointed audio data having endpoints marked by endpoint signals from the endpoint processor;

determining, by the speech recognition system, a value for a variable pause threshold for the particular user based on durations of pauses between words of the voice queries in the collection of voice queries;

generating, using the microphone of the speech recognition system, audio data corresponding to an utterance spoken by the particular user;

determining, by the endpointing processor of the speech recognition system, that speech of the particular user has not been detected for at least a first period of time equal to the default pause threshold;

after determining that speech of the particular user has not been detected for the period of time equal to the default pause threshold:

based on the value of the variable pause threshold for the particular user being greater than the default pause threshold, including audio data for audio before the first period and audio after the first period in a single voice query by bypassing (i) endpointing of the audio data by the endpointing processor and (ii) performing automated speech recognition on the audio data by the automated speech recognizer;

determining, by the endpointing processor of the speech recognition system, that speech of the particular user has not been detected for at least a second period of time equal to the value of the variable pause threshold determined for the particular user;

based on determining that speech of the particular user has not been detected for at least the second period of time equal to the value of the variable pause threshold determined for the particular user, endpointing, by the endpointing processor of the speech recognition system, the audio data by designating a temporal location in the audio data at which to end automated speech recognition system processing for the single voice query; and in response to endpointing the audio data, performing, by the automated speech recognizer of the speech recognition system, automated speech recognition on a portion of the endpointed audio data that (i) includes audio data before the temporal location in the audio data and (ii) excludes the audio data after the temporal location in the audio data.

19. The medium of claim 18, wherein the operations comprise:

determining, by the speech recognition system, a voice query length based on the voice queries in the collection of voice queries; and modifying, by the speech recognition system, the value for the variable pause threshold for the particular user based on the voice query length.

20. The medium of claim 19, wherein the voice query length is an average duration of the voice queries in the collection of voice queries.

21. The medium of claim 19, wherein the voice query length is an average number of words in the voice queries in the collection of voice queries.

22. The medium of claim 18, wherein the operations further comprise:

determining, by the speech recognition system, a quantity of voice queries based on quantities of the voice queries in the collection of voice queries that were spoken each day; and modifying, by the speech recognition system, the value for the variable pause threshold for the particular user based on the quantity of voice queries.

* * * * *